United States Patent [19]

Valsamis

[11] 4,213,709
[45] Jul. 22, 1980

[54] ROTARY PROCESSOR

[75] Inventor: Lefteris N. Valsamis, West Haven, Conn.

[73] Assignee: USM Corporation, Farmington, Conn.

[21] Appl. No.: 965,387

[22] Filed: Dec. 1, 1978

[51] Int. Cl.² .......................... B01F 7/02; B29B 1/06; B29B 3/02
[52] U.S. Cl. ...................................... 366/76; 366/77; 366/99; 366/307; 415/90; 415/102; 425/224; 425/466
[58] Field of Search ....................... 366/69, 77, 76, 99, 366/307, 52, 97, 136, 262, 263, 264, 266, 302, 306, 309, 312; 425/224, 466; 415/90, 101, 102

[56] References Cited

U.S. PATENT DOCUMENTS

| | | | |
|---|---|---|---|
| 3,308,510 | 3/1967 | Gabbrielli | 425/466 |
| 3,765,216 | 10/1973 | Green | 425/224 |
| 3,778,036 | 12/1973 | Collin | 425/209 |
| 4,041,745 | 8/1977 | Moreau | 425/224 |

*Primary Examiner*—Robert W. Jenkins
*Attorney, Agent, or Firm*—John P. Morley; Richard B. Megley; Vincent A. White

[57] ABSTRACT

A multi-stage rotary processor particularly useful as a pump for viscous materials. The multi-stage rotary processor includes a rotatable element having a surface carrying at least one primary processing channel connected to at least one further processing channel and a stationary element providing a complementary coaxial surface arranged with the channels to form enclosed primary and further processing passages. The stationary element also has associated with it an inlet for at least the primary processing passage, outlets for the passages and members extending into each channel for blocking material fed to the processing passages so that liquid material in contact with the rotating channel walls can be dragged forward in each channel. In the primary processing passage the dragged forward material is transferred to the further processing passage for discharge at a uniform pressure and rate.

11 Claims, 9 Drawing Figures

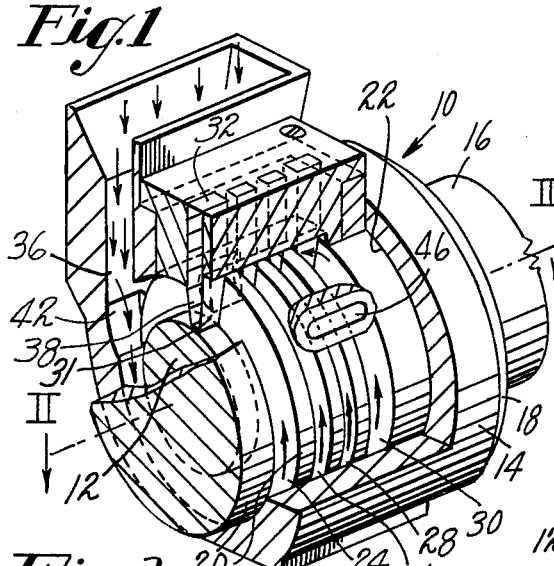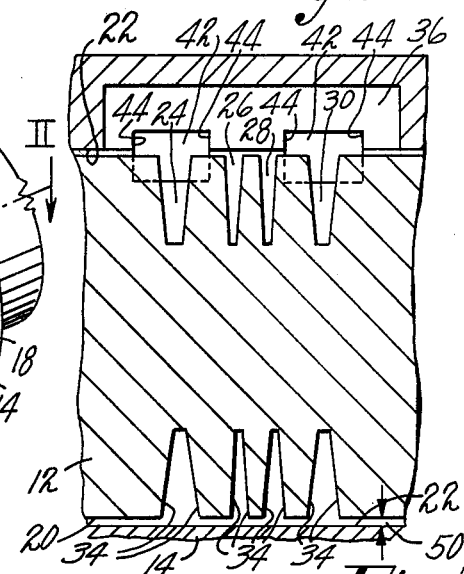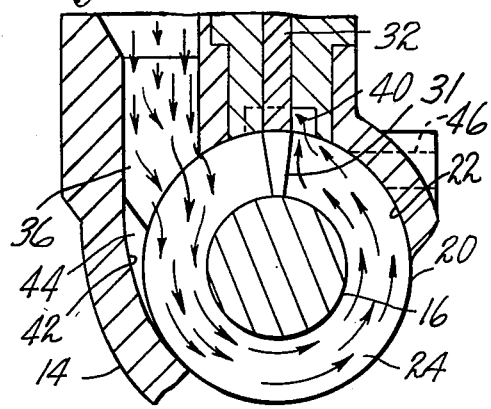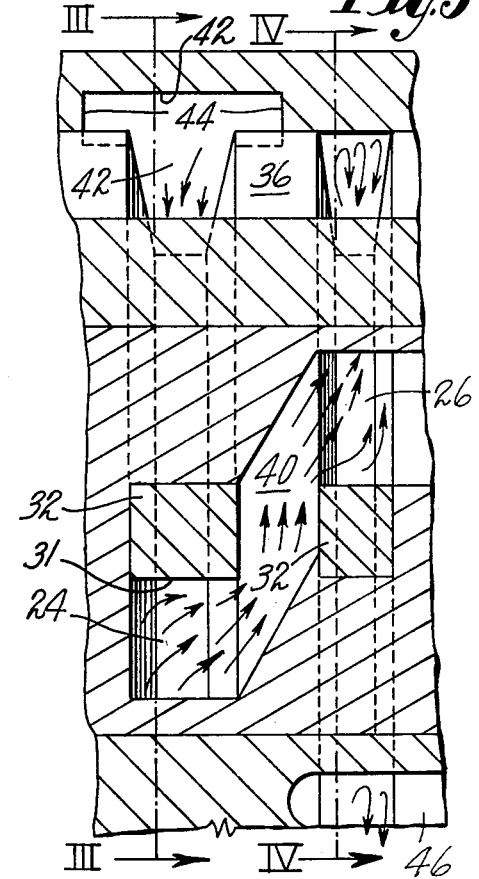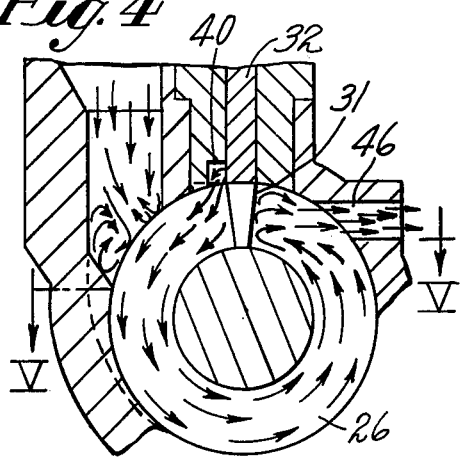

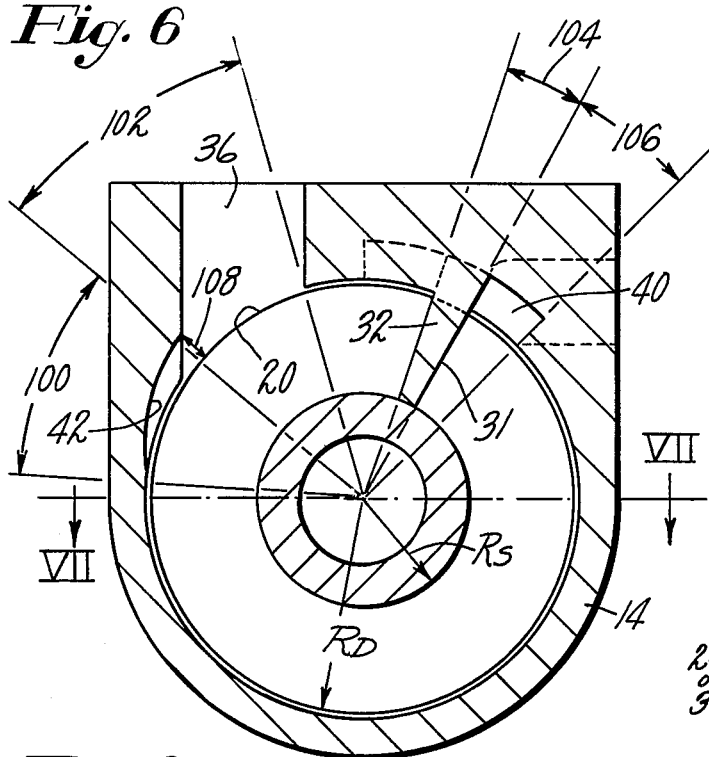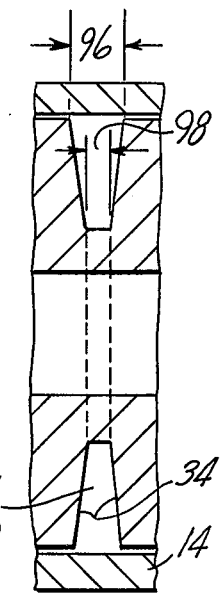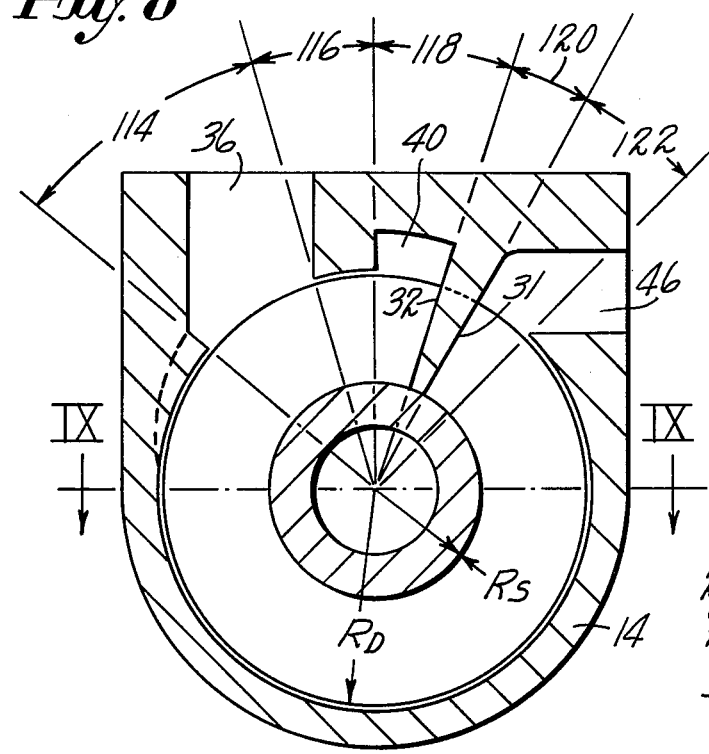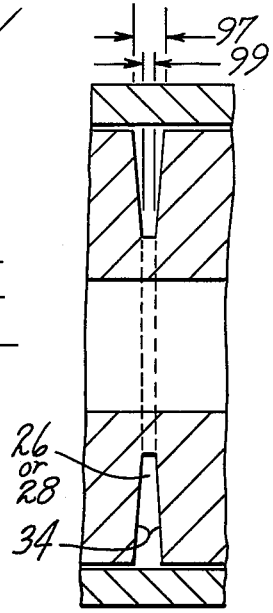

ROTARY PROCESSOR

THE FIELD OF THE INVENTION

This invention relates to novel, improved apparatus for processing materials which are liquids or which in the course of processing can be converted to the liquid state. The novel, improved apparatus is particularly adaptable for processing viscous liquid plastic or polymeric materials.

DESCRIPTION OF THE PRIOR ART

Copending U.S. patent application Ser. No. 795,211 filed May 11, 1977 as a continuation-in-part of U.S. application Ser. No. 654,040 filed Feb. 2, 1976 (now abandoned) and copending U.S. patent application Ser. No. 898,178 filed Apr. 20, 1978 by Zehev Tadmor disclose processes and apparatus for processing plastic or polymeric materials. Application Ser. Nos. 795,211 and 898,178 are expressly incorporated here by reference.

The essential elements of the basic, individual, annular processing passage described in those Applications comprise a rotatable element carrying at least one annular processing channel and a stationary element providing a coaxial surface cooperative with the channel to form an enclosed processing passage. The stationary element has an inlet to feed material to the passage for processing and an outlet spaced apart from the inlet a major portion of the circumferential distance about the processing passage to discharge processed material from the passage. A member providing a material collecting end wall is located in the passage near the outlet to obstruct or restrain movement of material in the passage and to coact with the rotating channel walls to provide relative movement between the material and the channel side walls rotated toward the outlet. This distinctive coaction permits liquid material in contact with the side walls of the rotating channel to be dragged forward to the material collecting end wall for controlled processing and/or discharge.

In the preferred embodiment of the invention described in application Ser. Nos. 795,211 and 898,178, the essential elements of the processing apparatus are arranged so that the rotatable channel carrying element is adapted for rotation in a stationary housing or chamber (the stationary element). The described processing channel and preferably a plurality of processing channels are formed in the cylindrical surface of a rotor each channel having opposing side walls extending inwardly from the rotor surface. The stationary housing or chamber described has an internal, cylindrical surface providing the cooperative coaxial surface which together with the annular processing channel(s) form an enclosed processing passage(s).

The method and apparatus of applications Ser. Nos. 795,211 and 898,178 are described as useful for conveying of solids, melting or plasticating plastic or polymeric material; conveying, pumping or pressurizing viscous liquid material; mixing, blending, dispersing and homogenizing material; and devolatilizing and/or bringing about molecular or microscopic or macroscopic structural changes by chemical reactions such as polymerization.

U.S. application Ser. No. 935,257 filed Aug. 21, 1978 by Peter Hold and Zehev Tadmor discloses and claims a novel and improved rotary processor for processing plastic or polymeric materials. Essentially, the rotary processor of that Application comprises a plurality of annular processing passages formed as described before by a rotating element carrying channels and a stationary element providing a coaxial surface. However, the annular processing passages are arranged to provide a plurality of stages in which processed material from one or more processing passage is transferred to one or more successive processing passages by way of internal transfer means formed in the coaxial surface of the stationary element. U.S. application Ser. No. 935,257 is also expressly incorporated here by reference.

The multi-stage rotary processors of the type described and claimed in U.S. application Ser. No. 935,257 are particularly adaptable for performing successive processing operations such as melting, mixing, blending and pressurizing of materials and variations of these as well as other processing operations. However, there is also a need for a compact, simple, relatively inexpensive and uncomplicated rotary processor useful for example, as a pump wich can be supplied with material by a simple feed e.g. gravitational feed, for pressurizing and discharge at high pressure. This invention is addressed to that need and provides novel and unexpectedly efficient apparatus to supply that need.

BRIEF DESCRIPTION OF THE INVENTION

The present invention presents to the art novel, improved processing apparatus particularly adaptable for pumping plastic or polymeric materials. Essentially, the novel apparatus of this invention comprises a rotary processor having at least two annular processing passages arranged for successive stages of processing. The passages are formed by a rotatable element carrying at least two channels and a stationary element providing a coaxial surface which, together with the channels form the annular processing passages. Additional structures associated with the stationary element of each passage are an inlet and an outlet spaced apart from each other and a member located near the outlet providing a material collecting end wall. One of the passages is a primary processing passage having means associated with it to provide an intake capacity which exceeds the throughput capacity of the passage. The second of the passages is arranged adjacent the primary passage and is aptly described as a further processing passage since means are provided to transfer material processed in the primary passage to the second passage for further processing.

In the apparatus of this invention, the goemetry of each of the two passages is selected to provide different discharge pressure characteristics for each passage. The primary processing passage is relatively wide for optimum feeding and develops relatively low discharge pressure but sufficient to transfer material to the further processing passage. In contrast, the further passage is relatively narrow in width and generates relatively high discharge pressures. The relative arrangement of the elements in combination with the distinctive features of the elements such as the intake capacity provided for the primary passage, the relative geometries selected for the primary and further processing passages and transfer means between the passages cooperate to provide a novel regulatory coaction so that the apparatus can deliver processed material at a uniform rate and pressure despite any variations in the feed of material to the apparatus.

BRIEF DESCRIPTION OF THE DRAWINGS

The invention will be described in connection with the attached drawings:

FIG. 1 is a perspective view of a rotary processor according to the present invention, which view is partly in section with parts broken away;

FIG. 2 is a simplified schematic sectional plan view of the rotary processor taken on section line II—II of FIG. 1.

FIG. 3 is a simplified schematic cross-sectional view taken on line III—III of FIG. 5 showing the path of movement of material through a primary processing passage.

FIG. 4 is a simplified schematic cross-sectional view taken on line IV—IV of FIG. 5 showing the path of movement through a further processing passage; and FIG. 5 is a simplified schematic cross-sectional plan view taken on line V—V of FIG. 4 showing the path of movement of material from the inlet opening through a primary processing passage, then through a transfer passage and through a further processing passage to discharge.

FIG. 6 is a simplified sectional view of a primary processing passage showing spacial relationships between certain members of the passage;

FIG. 7 is a sectional view along lines VII—VII of FIG. 6;

FIG. 8 is a simplified sectional view of a further processing passage showing spacial relationships between certain members of the passage; and FIG. 9 is a sectional view along lines IX—IX of FIG. 8.

DESCRIPTION OF THE PREFERRED EMBODIMENT

The novel multi-stage rotary processor of this invention is particularly useful as a pump for viscous liquids and is shown in that form in FIGS. 1 through 5. As shown there, the apparatus includes a rotatable element comprising a rotor 12 mounted on a drive shaft 16 for rotation within a stationary element comprising a housing 14. Rotor 12 is constructed with cylindrical, surface portions 20 having a plurality of processing channels 24, 26, 28 and 30 each having opposed side walls 34 extending inwardly from surface portion 20. Means for rotating rotor 12 are not shown but may be of any suitable type such as commonly used for rotating extruders or similar polymeric processing apparatus and well known to those in the art. Housing 14 of the stationary element provides a cylindrical surface 22 coaxial with, and co-operating with, surface portions 20 or rotor 12 to form with channels 24, 26, 28 and 30 enclosed annular processing passages.

The illustrated stationary element has an inlet opening 36 for feeding material to the apparatus for processing. Also associated with the stationary element, (housing 14) are internal transfer passageways 40 (FIGS. 3, 4 and 5) which connect channels 24 and 26 and channels 30 and 28 respectively. Inlet 36 preferably is spaced downstream apart from passageway 40 as far as is practical. Passageways 40 transfer processed material to channels 26 and 28 for further processing and discharge through common outlet 46. Extending into each channel is a member 32 which provides a material collecting end wall 31 and scraper portions in close relation to side walls 34 of each channel.

Each member 32 has a shape complimentary to and closely fitting the channel into which it extends and may be radially disposed or at another suitable angle depending upon the material and treatment desired. In the channels 24 and 30, end walls 31 collect material for transfer to channels 26 and 28. On the other hand, in channels 26 and 28, surfaces 31 collect material for discharge through outlet 46.

In the apparatus shown, channels 24, 26, 28 and 30 and members 32 are in axially symmetrical relation to rotor 12. In other words, channel 24 at the left end of rotor 12 has the same size and geometry as channel 30 at the right end and channel 26 has the same size and geometry as channel 28. Accordingly, the apparatus may be considered to be in two sections, a primary processing section at each end of rotor 12 and a further processing section between the two primary sections for receiving material from the primary sections for further processing. Each primary and/or the further processing sections may have one channel or a plurality of channels working in parallel. In the apparatus shown, for simplicity, the primary sections are shown as having only one channel each; but it will be understood that the primary sections and/or the further processing sections may have a plurality of processing channels.

For use as a pumping, primary channels 24 and 30 will have a geometry such as a relatively wide gap between side walls 34 for easy introduction of material to be processed to fill these channels. However, further channels 26 and 28 will have a geometry such as a relatively narrow gap between their opposed side walls 34 to provide greater pumping action following the design factors explained more fully in the above-referenced U.S. applications Ser. Nos. 795,211 and 898,178. For the best performance characteristics, the primary processing channels have a geometry and design so that under the selected conditions of operation they will deliver material at a rate at least equal to the rate at which material is processed and discharged from the channels of the further processing channels. It will be understood that there may be a plurality of interconnected primary processing channels with axially extending transfer passages to supply material to fill the further processing channel(s) in the manner disclosed in referenced U.S. application Ser. No. 935,257.

It may be important to minimize leakage from the channels into the journals in end walls 18 of processor 10 or not of the housing. For this reason, channels 24 and 30 are preferably located at the ends of 18 rotor 12 to insure that the lowest pressure is in the end channels and will cause minimum leakage. Leakage due to the high pressure developed in the narrower, centrally located channels 26 and 28 is at least partially resisted by pressure developed in channels 24 and 30 in the structure shown. The pressure developed in central channels 26 and 28 is substantially the same so that there will be substantially no force causing leakage from one of these central channels to the other.

As shown in FIG. 2, clearance 50 between cylindrical surface 20 of rotor 12 and interior surface 22 of housing 14 is narrow and can control or minimize leakage. However, it is usually desirable to provide auxiliary sealing means to eliminate or minimize leakage to the extent possible. Various seals may be used such as those disclosed in U.S. application Ser. No. 935,782 filed Aug. 22, 1978 by Peter Hold and Zehev Tadmor or in U.S. application Ser. Nos. 965,388 and 965,389 both entitled "Improved Seals for Rotary Processors" and filed concurrently with this Application by Peter Hold and Zehev Tadmor. All of the above Applications are expressly incorporated here by reference.

Internal transfer passageways 40 (see FIGS. 3, 4 and 5) are provided for conducting material which is processed in channels 24 and 30 and discharged under sufficient pressure to completely fill channels 26 and 28. Internal transfer passageways 40 are preferably cut in interior surface 22 of housing 14 to transfer material from one passage to another as described in the already referenced U.S. application Ser. No. 935,257. For transfer of material from a primary processing channel to a further processing channel, the associated transfer passageway 40 will extend from a location before wall 31 of member 32 of the primary processing channel to a location following member 32 in the further processing channel in the direction of movement of rotor 12. Each transfer passageway 40 will extend helically if members 32 in the processing channels are in line parallel to the axis of rotor 12. Alternatively, passageways 40 may be parallel to the axis of rotor 12 if member 32 in the further processing channel is offset from member 32 in the primary processing channel in a direction counter to the rotation of rotor 12. Also, if desired, external conduits such as disclosed in said application Ser. Nos. 795,211 and 898,178 might be used rather than the internal transfer passageways shown.

The path of processed material from channel 24 through transfer passageway 40 to channel 26 is shown more clearly in the sectional view of FIG. 5. As shown there, material dragged by the side walls of channel 24 is collected against and develops pressure at end wall surface 31 of member 32 and is forced by this pressure through passageway 40 to fill channel 26. And, in channel 26 pressure is developed at its end wall 31 to force the further processed material through outlet 46.

Inlet opening 36 through housing 14 provides means for feeding polymeric material for processing from a suitable feeder which may be a hopper or other source of material. In the preferred apparatus of this invention, inlet opening 36 is elongated axially so that the material supply is open to or communicates with all channels 24, 26, 28 and 30.

Apparatus having inlet means adapted to feed material only to the primary channel(s) and not communicating with the further processing channels are included within the scope of this invention. However, such an alternative arrangement of inlet means can significantly increase the overall size of the apparatus particularly when a plurality of primary processing channels are involved. Moreover, certain advantages are obtained by arranging the inlet means in communication with the primary as well as the further processing channels. These advantages will be explained and described later in the disclosure.

In FIG. 4, inlet 36 is shown also communicating with channel 26 (and/or 28). Under such circumstances, it is important that inlet 36 be spaced apart from the passageway 40 through which material is transferred into channels 26 and 28. This spacing need only be sufficient so that material in the distance between inlet 36 and passageway 40 has a resistance to flow to develop sufficient back pressure to insure that the transferred material completely fills channels 26 (and/or 28). However, this circumferential distance should not be substantially greater than that needed to develop the resistance since this spacing reduces the available circumferential distance in which pressure can build in channels 26 and 28 up to the end walls 31.

Referring again to FIGS. 1, 2 and 3, interior surface 22 of housing 14 is cylindrical over most of its extent but is provided with undercuts 42 extending over the portions of channels 24 and 30 adjacent inlet 36. Undercuts 42 have a width such that their side walls 44 extend out over cylindrical portions 20 of rotor 12 to form intake chambers designed to provide an intake capacity which exceeds the through-put capacity of each primary passage. For example, when viscous liquid material is supplied through inlet 36, the viscous liquid is dragged by cylindrical surface 20 of rotor 12 to the nip where the surface of undercuts 42 approach cylindrical surface 20 of rotor 12. This action facilitates squeezing of the viscous material into the channels 24 and 30. The designed excess intake capacity is a contributing factor providing that channels 26 and 28 of the further processing channels will be completely filled by material transferred to these further processing passages from the primary processing channels. Use of wide channels for the primary processing passage can provide an excess intake capacity but undercuts are definitely preferred for this function. It is important however, that undercuts 42 not extend over the portions of channels 26 and 28 facing inlet 36 since the undercuts would reduce the length of the portions of channels 26 and 28 available for pressure build up.

In operation of the apparatus of the invention, viscous liquid plastic or polymeric material is supplied through inlet 36 and, as explained, is forced by undercuts 42 into channels 24 and 30. As rotor 12 turns, the material in channels 24 and 30 is held by collecting end wall 31 of element 32 so that channel side walls 34 move relative to the body of material. Material in contact with opposed side walls 34 of channels 24 and 30 is dragged forward by the side walls toward walls 31 with build up in pressure which forces the material through transfer passageway 40 into channels 26 and 28 respectively. Because of back pressure due to the spacing of passageway 40 from inet 36, material discharged into channels 26 and 28 is packed into channels 26 and 28 to completely fill their cross sections. Material adjacent opposed side walls 34 of channels 26 and 28 is dragged forward by side walls 34 toward their members 32 with build up of pressure which forces the material through a common outlet 46.

As mentioned, additional advantages are obtained in apparatus having inlet 36 communicating with all of the primary and further processing passages. An important feature of apparatus having such a structure is that where the rate of supply of material from channels 24 and 30 to channels 26 and 28 is at least equal to or greater than the rate at which channels 26 and 28 can accept the transferred material, any excess over the amount channels 26 and 28 can accept will escape into the mass of material in the inlet opening 36. As a result, the pressure on the material in the channels 26 and 28 as it enters the portions sealed by surface 22 of housing 14 is substantially the same as the pressure existing in inlet 36. The pressure in inlet 36 may be atmospheric pressure or may be a higher pressure if that is found desirable to aid in filling channels 24 and 30. This insures that at all times channels 26 and 28 are completely filled but are not subject to any fluctuations in pressure which would be caused by fluctuation in the rate at which channels 24 and 30 deliver material to the completely closed portions of channels 26 and 28. For example, in the event there is a fluctuation or a temporary failure in channels 24 and 30 in delivering the required amount of viscous material to fill the cross sections of channels 26 and 28, viscous material in inlet opening 36 has direct access to the exposed portions of channels 26 and 28 so that any deficiency in filling these channels completely can be made up from viscous material in inlet 36. This feature assuring that channels 26 and 28 are kept full at constant initial pressure permits channels 26 and 28 to deliver processed material through outlet 46 at a constant rate and pressure.

In the description so far, the apparatus has been described as a pump for material which is initially viscous at the time it is supplied to the inlet opening. However, it is also possible to supply material in particulate form for melting and pumping provided that means, are included to prevent feeding or transfer of particulate material or unmelted granules of the material into channels 26 and 28. In operation with particulate material, it is particularly important that the rate at which channels 24 and 30 supply molten material to channels 26 and 28 is adequate to insure a continued escape of excess material from channels 26 and 28 into inlet 36 for return to channels 24 and 30. Maintenance of this rate of supply of material to channels 26 and 28 sweeps away granules so that they do not enter channels 26 and 28. Particularly is processing material which is initially particulate, it may be important to use a plurality of primary processing channels to insure melting of the resin and supply of molten material to a further processing channel or channels in order to achieve this excess material supply to the further processing channel or channels. Where a plurality of such primary processing channels is used as a primary processing section, the material inlet opening will extend over all of them and, if desired, over the further processing channel or channels as well.

The following description relates to illustrative apparatus of this invention designed to function as a pump capable of processing melted polymeric material such as melted polyethylene or polystyrene. The design is described in connection with FIGS. 1–5 but particularly with reference to FIGS. 6–9.

Essentially, the design of the pump involves an arrangement of the structural features and/or members similar to that shown in FIGS. 1 and 2. One of two primary processing channels is arranged at each end of the pump while two further processing channels are arranged between the primary processing channels. Inlet 36 communicates with each channel of the pump and a feeder (not shown) capable of gravitationally feeding viscous melted polymeric at a rate in excess of the intake capacity of the primary processing channels is arranged with inlet 36. For example, a feeder capable of gravitationally feeding melted polymeric material at a rate up to about 2500 kg/hr. would be suitable. Means for heating the material as it is processed may also be included. For example, chambers can be provided on the outside of each channel so that a temperature control fluid can be introduced to the chambers for heat transfer through the walls of the channel as described in referenced U.S. patent application Ser. Nos. 795,211 and 898,178.

Details relating to the shape and illustrative spacial and dimensional relationships between elements of each primary processing passage will be better appreciated by reference to FIGS. 6 and 7. In the primary processing channel shown, the channel radius ($R_D$) may be between about 175 mm to about 525 mm while the shaft radius $R_s$ may be between about 85 mm to about 260 mm. The maximum width 96 between the side walls of the primary processing channel may be between about 6 mm to about 20 mm while the minimum width 98 between the channel walls may be between about 3 mm to about 10 mm. The angular distances about the circumference of the channel of various structural members of the channel are designated in FIG. 6 as 100, 102, 104, and 106. Accordingly, the angle of undercut 42 is designated as 100 and may be between about 30° to about 90° while 102 defines the angle of the opening of inlet 36 and may be between about 30° to about 90° mm. Member 32 has an angular distance shown as 104 and may be between about 3° to about 12° while the angular distance of the outlet from the primary processing channel e.g. transfer passageway 40 shown as 106 may be between about 10° to about 20°. The maximum distance between the top surface 20 of the channel walls of channel 24 (or channel 30) and surface 22 providing undercut 42 is designated as 108 and may be between about 20 mm to about 60 mm.

Details relating to the design of the shape and spacial and dimensional relationship between elements of the further processing passage are shown in FIGS. 8 and 9. $R_D$ and $R_s$ are in the same range as in the primary processing passage of FIGS. 6 and 7. However, as shown in FIG. 9, the maximum width 97 of the further processing channel is considerably less than that of the primary processing passage and may be between about 3 mm to about 10 mm while the minimum width may be between about 1.5 mm to about 5 mm. In FIG. 8, the angular distances about the circumference of the various structural members are designated an angles 114, 116, 118, 120 and 122. The distance of inlet 36 is designated as 114 and may be between about 30° to about 90°. The angular distance between inlet 36 and passageway 40 is designated as 116 and may be between about 10° to about 30° and the angular distance 118 of passageway 40 may also be between about 10° to about 30°. The angular distance of member 32 is designated as 120 and may be between about 3° to about 12° and the angular distance of outlet 46 (122) may be between about 10° to about 30°.

As shown in FIGS. 7 and 9, the geometry of both of the channels of the primary and further processing passages are wedge-shaped. A wedge-shaped geometry for both passages is particularly preferred because it ensures optimum pressure generation at any radii. Therefore, wedge-shaped channels provide more efficient pumping since the shape eliminates an additional circulation pattern which is observed in parallel channel discs due to the radial pressure distribution. A pump of the above described design can be rotated at speeds between about 20 rpm to about 100 rpm to pump melted polymeric materials.

From the above description, it should be apparent that the novel apparatus of this invention is distinctively different particularly when compared to pumps known to the art. Compared to melt extruders, the apparatus of this invention presents such advantages of compact size, lower power consumption and higher production potential. Compared to gear pumps, the apparatus of this invention presents advantages such as higher production potential, better intake capacity and has not intermeshing surfaces where foreign objects may cause damage. Accordingly, the invention described and claimed presents to the art novel and useful apparatus providing unexpectedly improved performance characteristics over apparatus known to the art at the time this invention was made.

I claim:

1. Apparatus for processing materials which are or in the course of processing become liquid and which comprises a rotatable element carrying at least one primary processing channel and at least one further processing channel with the geometry of the primary channel providing a processing capacity relative to the geometry of the further channel sufficient to transfer material from the primary channel to the further channel at a volume rate at least equal to the rate at which the further channel processes and discharges material and, a stationary element providing a coaxial surface cooperative with the processing channels to provide an enclosed primary processing passage and an enclosed further processing passage; stationary solid members extending into each channel and providing a material collecting end wall for each channel, an inlet through the stationary element for introducing the material into at least the primary processing channel, means adjacent the inlet providing only the primary processing channel with an intake capacity which exceeds the through-put capacity of the primary processing channel, means to transfer material processed in the primary processing channel to the further processing channel at said volume rate and an outlet for discharge of material from the further processing passage; said apparatus also including means to introduce the material to the primary processing channel at a volume rate at least equal to the rate needed to fill the uptake capacity of the primary processing channel, the rotatable element being rotatable in a direction from the inlet toward the outlet to provide a coaction between the rotating side walls of the channels and the material collecting end wall of the channels so that material in contact with the side walls is dragged forward to the material collecting end wall so that material collected at the end wall of the primary processing passage is transfered to the further processing passage and material collected at the end wall surface of the further processing passage can be discharged from the apparatus.

2. Apparatus of claim 1 where the inlet communicates with both the primary processing channel and the further processing channel and said inlet is spaced from the transfer means a distance to provide resistance to flow to develop sufficient back pressure so that transferred material can completely fill the further processing channel.

3. Apparatus of claim 1 or 2 where the means to provide the primary processing passage with an intake capacity exceeding the through-put capacity is an undercut provided in said stationary element adjacent the primary processing channel.

4. Apparatus of claim 1 or 2 where the means to transfer material is a passageway formed in the interior surface of the stationary element and a portion of the passageway extends from the primary processing channel before the end wall thereof to the further processing channel following the material collecting end wall of the further processing channel.

5. Apparatus of claim 1 or 2 in which at least two primary processing channels are provided to process and supply material to fill at least one further processing channel.

6. Apparatus of claim 1 or 2 in which the rotatable element is axially symmetrical having primary processing channels at opposite ends of the element and at least one further processing channel between the primary processing channels.

7. Apparatus of claim 1 or 2 where said channels are wedge-shaped.

8. Apparatus for processing materials which are or in the course of processing become liquid and which comprises a rotor carrying at least two primary processing channels and at least one further processing channel positioned between said primary channels, the geometry of the primary channels, providing a processing capacity relative to the geometry of the further channel sufficient to transfer material from the primary channels to the further channel at a rate at least equal to the rate at which the further channel processes and discharges material and, a stationary element providing a coaxial surface cooperative with the processing channels to enclose the primary and the further channels solid members extending into each channel and providing a material collecting end wall for each channel; material transfer means comprising passageways cut into the internal surface of the stationary element and extending from the primary channels before the end walls thereof to the further channel following the material collecting end wall of the further channels; an inlet communicating with at least said processing channels and, an undercut in the stationary element adjacent the inlet and arranged only with the primary channels to provide an intake capacity for the channels which exceeds the through-put capacity of the channels, said apparatus also including means to introduce the material to the primary processing passages at a rate at least equal to the rate needed to fill the primary processing passages, the rotor being rotatable in a direction from the inlet toward the outlet to provide a coaction between the rotating side walls of the channels and the material collecting end wall of the channels so that material in contact with the walls is dragged forward to the material collecting end walls and material collected at the end wall surfaces of the primary processing channels is transferred to the further processing channel and material collected at the end wall of the further processing channel can be discharged from the apparatus.

9. Apparatus of claim 8 where the inlet communicates with all primary processing channels and all further processing channels and a distance is provided between the location at which material is transferred to the further processing channel and said inlet is spaced from the transfer means a distance to provide a resistance to flow to develop sufficient back pressure so that transferred material can completely fill the further processing channel(s).

10. Apparatus of claim 8 or 9 in which the rotor is axially symmetrical having at least one primary processing channel at opposite ends of the rotor and at least one further processing channel between the primary processing channels.

11. Apparatus of claim 8 or 9 where said channels are wedge-shaped.

* * * * *